(12) United States Patent
Hoffmann et al.

(10) Patent No.: US 7,143,573 B2
(45) Date of Patent: *Dec. 5, 2006

(54) GAS TURBINE SET

(75) Inventors: Juergen Hoffmann, Rieden (CH); Stefan Rofka, Nussbaumen (CH); René Waelchli, Niedergoesgen (CH); Rolf Dittmann, Nussbaumen (CH)

(73) Assignee: Alstom Switzerland Ltd, Baden (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/635,668

(22) Filed: Aug. 7, 2003

(65) Prior Publication Data

US 2004/0025491 A1    Feb. 12, 2004

Related U.S. Application Data

(63) Continuation of application No. 09/993,545, filed on Nov. 27, 2001, now Pat. No. 6,644,012.

(30) Foreign Application Priority Data

Nov. 2, 2001    (CH) .............................. 2001 2015/01

(51) Int. Cl.
*F02C 6/00*    (2006.01)
*F02C 7/18*    (2006.01)

(52) U.S. Cl. ..................... 60/39.182; 60/784; 60/785; 60/775; 60/806

(58) Field of Classification Search ............. 60/39.182, 60/806, 784, 726, 728, 775, 39.181, 39.183
See application file for complete search history.

(56) References Cited

U.S. PATENT DOCUMENTS

| 3,901,026 | A |   | 8/1975  | Quinn ........................ 60/726 |
| 3,973,396 | A |   | 8/1976  | Kronogard ................... 60/806 |
| 4,767,259 | A |   | 8/1988  | Kurosawa et al. ............. 60/806 |
| 5,329,758 | A | * | 7/1994  | Urbach et al. ................ 60/784 |
| 5,417,053 | A |   | 5/1995  | Uji ............................... 60/784 |
| 6,050,080 | A |   | 4/2000  | Horner ........................ 60/728 |
| 6,065,282 | A | * | 5/2000  | Fukue et al. ............. 60/39.182 |
| 6,089,011 | A | * | 7/2000  | Shouman ..................... 60/775 |
| 6,161,385 | A |   | 12/2000 | Rebhan et al. |
| 6,393,826 | B1|   | 5/2002  | Yamanaka et al. ............ 60/726 |
| 6,412,270 | B1|   | 7/2002  | Mortzheim et al. ........... 60/806 |
| 6,412,285 | B1| * | 7/2002  | Ranasinghe et al. ...... 60/39.182 |
| 6,487,863 | B1|   | 12/2002 | Chen et al. ................... 60/806 |
| 6,640,550 | B1| * | 11/2003 | Hoffmann et al. ............ 60/785 |

FOREIGN PATENT DOCUMENTS

DE    199 07 907 A1    8/2000

(Continued)

OTHER PUBLICATIONS

Patent Abstracts of Japan vol. 1999, No. 12, Oct. 29, 1999, UP 11 182263 A (Hitachi Ltd).

*Primary Examiner*—Thai-Ba Trieu
(74) *Attorney, Agent, or Firm*—Buchanan Ingersoll & Rooney PC

(57) ABSTRACT

A gas turbine set, with a cooling air system through which at least one cooling air mass flow flows from a compressor to thermally highly loaded components of the gas turbine set. Pressure increasing ejectors are arranged in a cooling air duct of the cooling air system for increasing the pressure of flowing cooling air. The ejectors are operable with a working fluid. The working fluid mass flow is less than twenty percent of a driven cooling air mass flow.

11 Claims, 2 Drawing Sheets

FOREIGN PATENT DOCUMENTS

| | | |
|---|---|---|
| DE | 100 41 413 A1 | 3/2001 |
| EP | 0 062 932 B1 | 12/1984 |
| EP | 0 515 995 A2 | 12/1992 |
| EP | 0 515 995 A3 | 12/1992 |
| EP | 0 516 995 A1 | 12/1992 |
| EP | 0 620 362 A1 | 10/1994 |
| EP | 0 684 369 B1 | 8/1998 |
| EP | 0 995 891 A2 | 4/2000 |
| EP | 1 028 230 A1 | 8/2000 |
| EP | 1 128 039 A2 | 8/2001 |
| GB | 2 236 145 A | 3/1991 |

* cited by examiner

GAS TURBINE SET

This application is a continuation of application Ser. No. 09/993,545, filed on Nov. 27, 2001 now U.S. Pat. No. 6,664,012.

This application claims priority under 35 U.S.C. §§ 119 and/or 365 to Application No. 2001 2015/01 filed in Switzerland on Nov. 2, 2001, the entire content of which is hereby incorporated by reference.

FIELD OF THE INVENTION

The invention relates to a gas turbine set with a cooling air system through which at least one cooling air mass flow flows from a compressor to thermally highly loaded components of the gas turbine set.

BACKGROUND OF THE INVENTION

In parallel with the requirements on the performance and efficiency factor of gas turbine sets, there are increased requirements on the cooling of the machine components subject to high thermal loads on the one hand, and on the design of the cooling system on the other hand. Thus sufficient cooling has to be ensured in the interests of operating safety. On the other hand, the cooling air consumption has to be limited as far as possible. It was proposed in EP 62932 to cool the components of a gas turbine with steam in a closed circuit. This requires a comparatively expensive sealing of the components conducting the cooling steam. A purely convective cooling of the components takes place at the same time; the effect of a cooling film for reducing heat entry is hereby dispensed with. In a number of further documents, such as EP 684 369 or EP 995 891 and U.S. Pat. No. 6,161,385 corresponding thereto, it is proposed to use steam or a steam-air mixture for the cooling of film-cooled components. However, such methods consume comparatively large amounts of steam, which has to fulfill high requirements on purity and superheating so that blockage of the film cooling bores, often only a few tenths of a millimeter wide, does not occur. Even if the required steam quantity and quality are available, cooling of the gas turbine set with steam, instead of with compressor bleed air, is not inherently more reliable.

Consequently, cooling with compressor bleed air has as usual a series of well-founded advantages, the amount of cooling air withdrawn being minimized in the interest of the working process. Consequently, the cooling air system is designed always closer to the limits, in order to ensure sufficient cooling in the—from the cooling technology viewpoint—unfavorable operating point, while not using more cooling air than absolutely necessary. This means, on the one hand, a high sensitivity to deviations of the working process from the design point of the cooling, if, for example, the amounts of cooling air vary due to displacements of the pressure ratios in a machine. On the other hand, an over-cooling of the thermally stressed components results in a series of other operating points, so that the performance and efficiency factor potentials remain unexploited.

It was therefore occasionally proposed, for example, in EP 1 028 230, to arrange variable throttle points in the cooling air path. DE 199 07 907 proposes direct adjustment of the initial pressure of the cooling air by means of adjustable compressor blade rows which are arranged immediately neighboring a bleed point for cooling air. Although the implementation of this measure is promising, it is, of course, very expensive, and scarcely suited just for a retro-fitting of existing gas turbine sets. Besides, the building of movable parts into the cooling air system holds the latent danger of blockage of the cooling air ducts on failure of mechanical components.

A further relevant question is the feed of cooling air to structures in the region of the combustor or to the front side of the first guide blade row of a turbine. While it is sought to minimize the pressure loss of the working medium, and thus to keep the pressure at the turbine inlet as close as possible to the compressor end pressure, a sufficient cooling air mass flow has to pass through narrow cooling air channels and cooling bores. This of course requires a corresponding pressure drop over the cooling air system, so that the initial pressure of the cooling air system also cannot be higher than the compressor end pressure. Thus also in this regard only an appropriate, but not finally completely satisfactory, compromise can be found between the performance and efficiency factor data of a gas turbine set, on the one hand, and ensuring that there is sufficient cooling.

SUMMARY OF THE INVENTION

The present invention has as its object to avoid the disadvantages of the state of the art, in a gas turbine set of the kind named at the beginning.

The core of the invention is thus to provide, in an air-cooled gas turbine set, means for increasing the total pressure in the channels which conduct cooling air, and thus to vary the cooling air mass flow at a given cooling air bleed pressure and counter-pressure.

In a preferred embodiment of the invention, ejectors operable with a working fluid are arranged in the cooling air channels.

In this manner, the unavoidable cooling air pressure losses in cooling the combustor and the first rows of turbine blades can be compensated, at least to an important degree. A further concept on which the invention is based is to increase the total initial pressure of the cooling air in strongly throttled cooling air ducts, the film cooling bores also representing throttle points in the proper sense. A further option of embodying the invention is to dispense with an internal throttling and mass flow adjustment of the cooling air, as is often implemented in the form of diaphragms built into the cooling air ducts, and instead to carry out the cooling air bleed from the compressor at low pressure, and to set the necessary total initial pressure by a pressure increase in the cooling air channels. Furthermore, the invention is particularly suitable in order to vary the cooling air mass flow during operation, preferably in dependence on suitable process parameters. For example, this is possible comparatively easily in the embodiment in which the ejectors are used as means to increase the pressure, in that the intervention is only on the small working fluid mass flow instead of the total cooling air mass flow.

Besides the advantage of not having to adjust the whole cooling air mass flow, and thus also not having to intervene directly in the main cooling system, an existing gas turbine set is comparatively easy to retrofit to the state according to the invention, in comparison with, for example, variable throttle points in the main cooling air system.

As working fluid for the ejector or the ejectors, a working air mass flow of higher pressure than that of the driven cooling air mass flow is particularly suitable, for example. This can be derived from an externally arranged compressor, but can also particularly appropriately be an air mass flow branched off from a higher pressure compressor stage.

Furthermore, a steam mass flow is also very suitable as the working fluid, preferably being correspondingly superheated. Condensation in the cooling air duct is thus avoidable in all circumstances. In contrast to the supply of steam as the working medium, either for purely steam cooling or for steam-air hybrid cooling, it is an advantage that the qualitatively high-value and highly pure steam is required in only comparatively small amounts. The embodiment is advantageous if the gas turbine set is provided with a waste heat steam generator for operation in a combined plant or for the recovery of process steam. Furthermore, there can appropriately also be used as the working fluid, steam which was produced in a cooling air cooler, as in DE 100 41 413, or in a compressor intermediate cooler, as in EP 516 995.

The cooling system, in an appropriate design, is furthermore still inherently safer, since a minimum of cooling air flow is still ensured, even when there is a complete failure of the working fluid supply, in particular of a steam supply. In all, it remains to be established in this connection that the mass flow of the working fluid is in general less than 20%, preferably less than 10%, in particular even less than 5% of the driven cooling air mass flow, so that the working fluid has per se no significant effect as a coolant.

As already mentioned, means are arranged in a preferred embodiment for adjusting the working medium flow in its feed line to an ejector. The invention is particularly suitable in connection with a gas turbine set which is provided with cooling systems of different pressure stages, for example, a high pressure cooling system and a low pressure cooling system, the high pressure cooling system being supplied from a compressor end stage and the low pressure system being supplied from an intermediate compressor stage. In such a case, a preferred embodiment is to arrange in the low pressure system, ejectors which are driven with a working fluid branched off from the high pressure cooling system. This is found to be particularly advantageous if the pressure buildup in the compressor is displaced, which is particularly the case when a cooling takes place during the compression, for example, in the case of a cooling system in the compressor.

The embodiment of a gas turbine set according to the invention is particularly advantageous if a gas turbine set with sequential combustion is concerned, a first combustor and a first turbine being cooled by a high pressure cooling system, and a second combustor and a second turbine being cooled by a cooling system of a lower pressure stage.

BRIEF DESCRIPTION OF THE DRAWINGS

The invention is described in detail hereinbelow with reference to examples illustrated in the accompanying drawing.

The embodiment examples and Figures are to be understood as only informative, and are not in any way to serve as a limitation of the invention characterized in the claims.

DETAILED DESCRIPTION OF THE INVENTION

Figure 1:
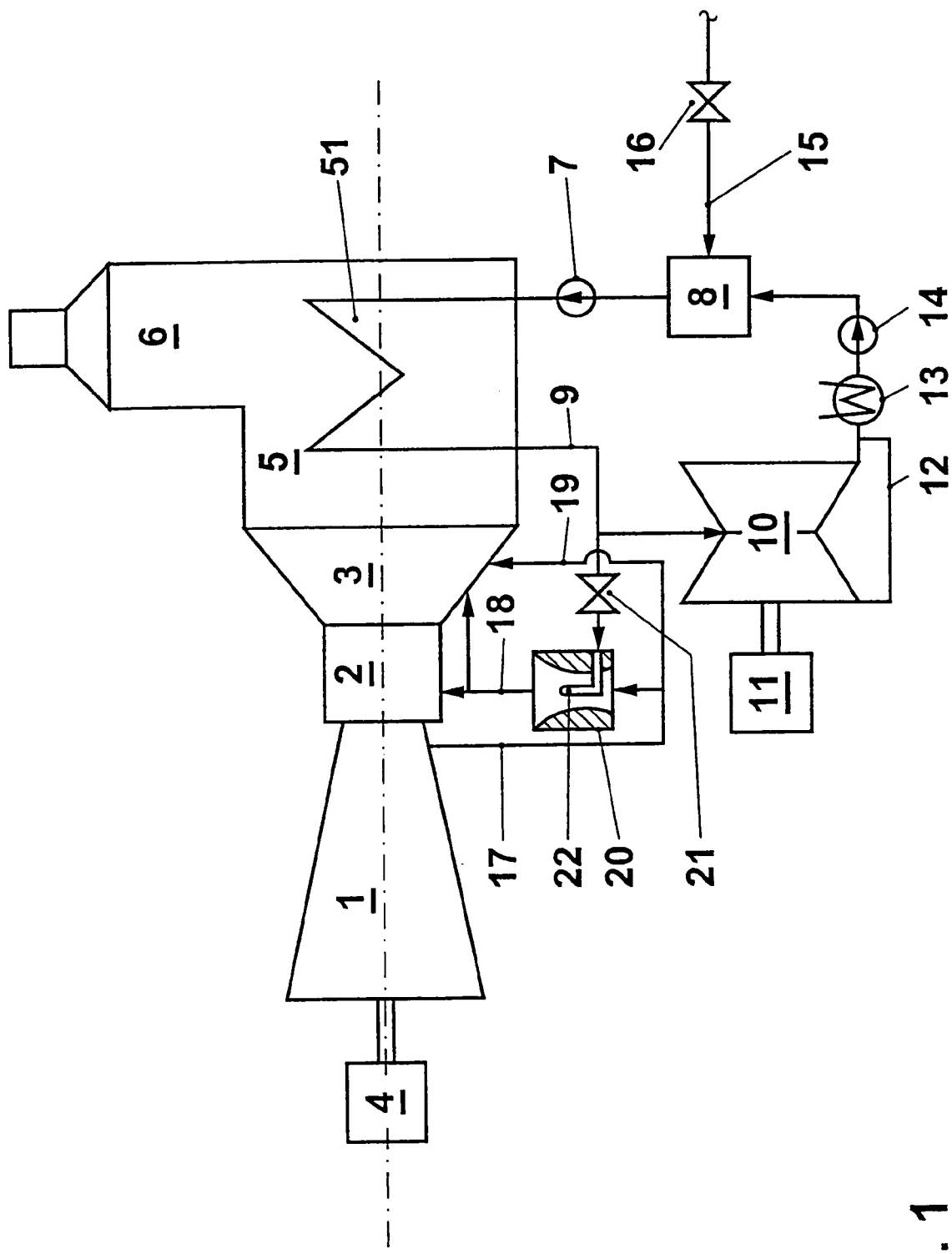
FIGS. 1 and 2 show two possible and advantageous embodiments of the invention, which are to be understood as in no way definitive for the possible embodiments of the invention characterized in the claims. Unnecessary details have been omitted for a clearer understanding of the invention.

In the example shown in FIG. 1, a gas turbine set integrated into a combination plant is shown, according to an embodiment of the invention. A compressor 1 compresses air to a pressure and delivers this into a combustor 2. A fuel is burned in the compressed air in the combustor. The resulting hot flue gases flow through a turbine 3, where they provide power to drive the compressor and an external shaft power user such as a generator 4. The expanded flue gases, which are still at a high temperature, pass through a waste heat steam generator 5 and heat and there evaporate a feedwater mass flow, flowing over heating surfaces of a heat exchanger 51 there, before they flow out into the atmosphere via a chimney 6. On the steam side, a feed pump 7 delivers a water mass flow from a container 8 into the heat exchanger 51, where this water evaporates and the resulting steam is superheated. Live steam 9 flows to a double-pass steam turbine 10, where the steam is expanded. The steam turbine drives a generator 11. The expanded steam 12 flows into a condenser 13. The condensed water is delivered back to the container 8 by a condensate pump 14. The container 8 furthermore has a feed duct for makeup water 15, to compensate for any losses. The makeup water supply can be adjusted by an adjusting element 16. This steam circuit is shown very simplified; a skilled person knows the possible embodiments, which are however not relevant to the invention in detail. The combustor 2 and the turbine 3 of the gas turbine set are exposed to high thermal loads. The gas turbine set is therefore provided with a cooling system 17 by means of which cooling air flows from the end stages of the compressor to the thermally highly loaded components of the gas turbine set. The cooling system 17 branches into a first branch 18 through which the combustor and the first turbine guide row or the first turbine stage are cooled, and a second branch 19 through which cooling air flows to the second and possibly the third stage of the turbine 3. In the second branch 19, the pressure drop over the cooling air system is large enough to ensure a sufficient cooling air mass flow. An ejector 20 is arranged in the first branch 18. A partial flow of the live steam 9 can be conducted via an adjusting member 21 to the ejector as working fluid. This flows out at high speed through a nozzle, which is arranged in about the narrowest cross section of a convergent-divergent flow cross section of the cooling air duct. A total pressure increase of the cooling air occurs downstream of the ejector, so that the cooling air mass flow in the first branch 18 is increased. This embodiment of the invention can be implemented without the large apparatus cost of a combined circuit, in that only a small, simple steam generator is built into the exhaust gas section of a gas turbine. Percentage of the cooling air mass flow, for example 2% to 5%. Since the required pressures of the working steam are not too high, a sufficient superheating of the steam can be attained even at quite a low steam temperature. The invention can therefore be implemented if, as proposed in DE 100 41 413, cooling air coolers are embodied as steam generators, or if, as EP 515 995 proposes, the heat to be removed is used for steam production in an intermediate cooler of the compressor. In particular, on integration into a combined plant, it is not at all necessary to use live steam as the working fluid for the working nozzle of the ejector; bleed steam of a suitable temperature and suitable pressure can also be used here.

Figure 2:
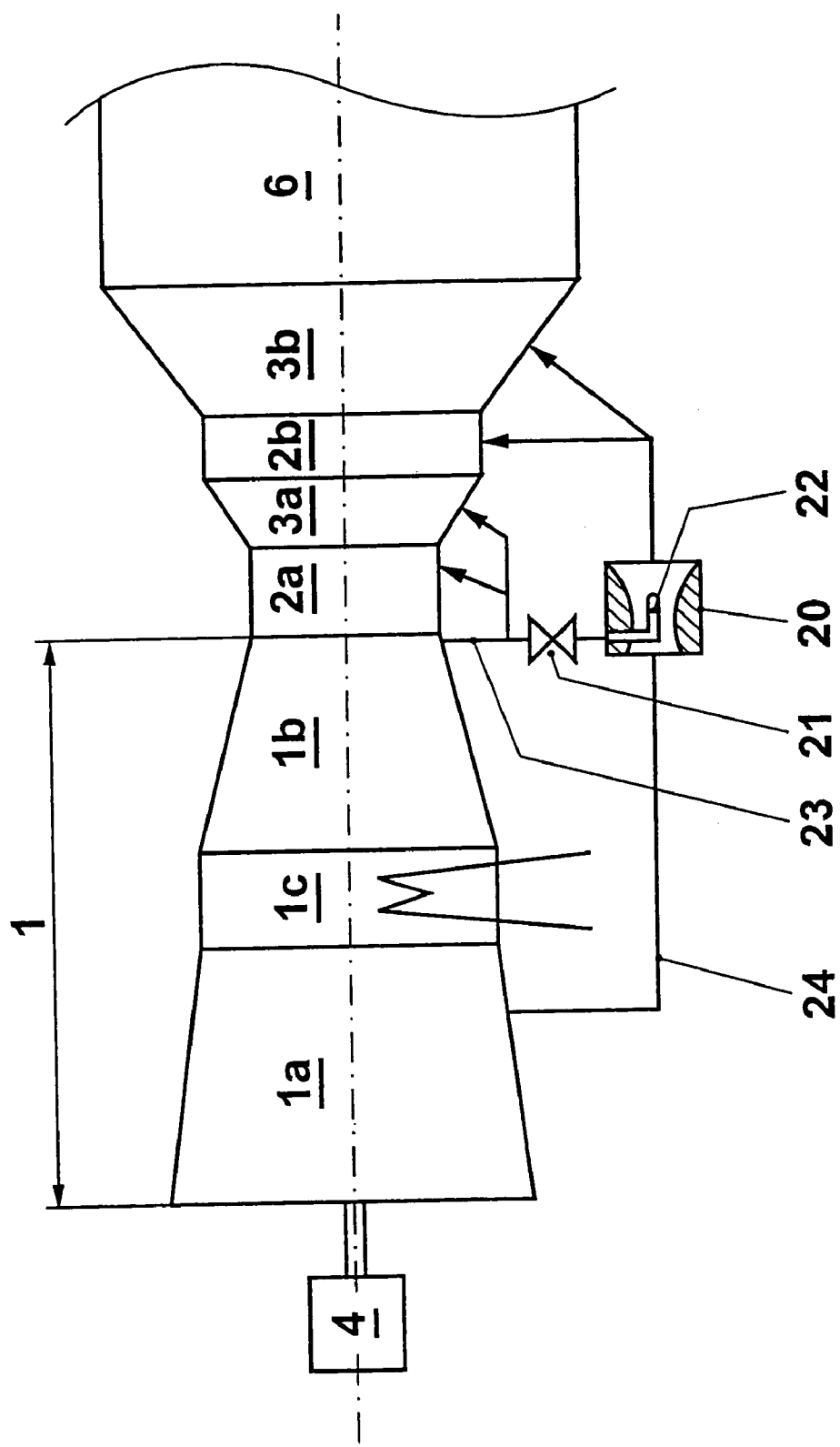

FIG. 2 shows a gas turbine set of the most modern construction, with sequential combustion. Such a gas turbine set is known from EP 620 362. A compressor 1 compresses and delivers air at a high pressure into a first combustor 2a, in which the first amount of fuel is burned. The compressed flue gas is partially expanded in a first turbine, high pressure turbine 3a, a pressure ratio of 1.5–2 being typically reached, and flows with still higher temperature and high pressure into a second combustor 2b. The oxygen content in the flue gas after the first combustor is always still comparatively high, typically 15%–17%. Additional fuel can therefore be readily introduced into the second combustor 2b and burned. The after-heated hot gas is expanded in a turbine 3b almost to ambient pressure, and flows out into the exhaust gas section 6. A waste heat steam generator (not shown) can readily be situated here; gas turbine sets with sequential combustion are in principle quite particularly suitable for applications in combined plants. On expansion in the turbines 3a and 3b, the flue gases give up power which serves to drive the compressor 1 and a generator 4. On the basis of the high pressure ratio implemented in such a gas turbine set, the cooling system is embodied in two parts, with a high pressure cooling system 23 and a low pressure cooling system 24. The high pressure cooling system branches air from the compressor outlet and uses it for cooling the first combustor 2a and the high pressure turbine 3a. The low pressure cooling system 24 branches air from an intermediate compressor stage, and uses it for cooling the second combustor 2b and the low pressure turbine 3b. The division of the cooling system into two portions makes it possible to supply the high pressure portion of the hot gas path with cooling air at high pressure, and thereby to avoid strong throttling, with attendant losses, of the high pressure cooling air for cooling the low pressure section of the hot gas path. A cooling system with more than two pressure stages can of course also be implemented in principle. The compressor 1 is divided into a first partial compressor 1a and a second partial compressor 1b, between which an intermediate cooler 1c is arranged. By the operation of the intermediate cooler 1c, the power needed to drive the compressor is reduced, so that the efficiency factor and the effective work of the gas turbine set rise. This effect can also be attained by water injection into the compressor or a supersaturation of the intake air with moisture, effecting an intensive internal cooling of the compressor due to the evaporation of this moisture. The cooling of the air in the compressor has yet another effect: as a skilled person determines by a simple consideration of stage kinematics, when operating with an intermediate cooling in the compressor, the pressure buildup is shifted into the rear compressor stages. While the relative pressure buildup over the turbine stages remains to a good approximation unchanged, the pressure buildup in the compressor stages is clearly displaced into the second partial compressor 1b. From this there results a clear reduction of the working pressure difference over the low pressure cooling system 24, and thence a reduction of the low pressure cooling air mass flow. If the low pressure cooling system 24 is dimensioned such that the cooling air mass flow is sufficient during operation with cooling in the compressor, this leads during operation without compressor cooling to a clear over-cooling of the low pressure hot gas path, that is, the units 2b and 3b, with negative consequences for performance and efficiency factor. Therefore, according to the invention, an ejector 20 is arranged in the low pressure cooling system, with its ejector nozzle 22 connected to the high pressure cooling system via an adjusting member 21. In a first operating region, without compressor cooling, the adjusting member 21 is closed or only a little opened; the low pressure cooling system is then set up for a just sufficient cooling air mass flow. In operation with compressor cooling, the adjusting member 21 is opened, and the high pressure cooling air emerging at high speed from the ejector nozzle changes the pressure ratios in the low pressure cooling system such that a sufficient cooling air mass flow is ensured. In a known manner, this system even operates in a self-regulating manner: to the extent to which the pressure buildup is displaced into the second partial compressor 1b, the pressure drop available for the working fluid flow of the ejector increases, due to which the effect of the drive in the low pressure cooling system is automatically supported. With a corresponding design of the system it would therefore be conceivable in principle to replace the adjusting member 21 by a fixed throttle point for setting the throughflow, and to dispense with external interventions on the working fluid flow. Similarly to an intermediate cooling, the adjustment of plural guide blade rows can also effect a displacement of the pressure buildup in the compressor, which can likewise be compensated in relation to the cooling air mass flows by means effecting the use of a pressure increase in the cooling air channels.

Furthermore the invention also makes it possible to reduce the amount of cooling air to a minimum necessary for operating safety, in dependence on the hot gas temperature in the region of the components to be cooled, and to increase it correspondingly at high gas turbine load.

It goes without saying that a gas turbine set with only one combustor and only one turbine can also be equipped with a cooling system as shown above, with two or more pressure stages.

The invention can easily be combined with other usual measures, such as an arrangement of cooling air coolers with which a skilled person will be familiar.

The ejector nozzle of the ejector can in particular also be operated supercritically, when the initial pressure of the working fluid permits this, such that the outflow from the ejector nozzle takes place at supersonic speed. The deceleration of the working medium flow then takes place by means of an impact system, which with corresponding contouring of the flow channel may contribute to a very efficient effect.

In principle, other means, such as, for example, a pressure wave generator, can find application in a suitable manner for increasing the pressure of the cooling air.

In the light of the above statements, many possible embodiments of the invention characterized in the claims will become apparent to the skilled person.

What is claimed is:

1. A gas turbine set, with a cooling air system through which at least one cooling air mass flow flows from a compressor to thermally highly loaded components of the gas turbine set, wherein means for increasing the pressure of flowing cooling air are arranged in a cooling air duct of the cooling air system, the means for increasing the pressure are ejectors operable with a working fluid, wherein the working fluid mass flow is less than 20% of a driven cooling air mass flow;

wherein the gas turbine set is equipped with a high pressure cooling system and a low pressure cooling system, the high pressure cooling system being supplied from one of the end stages of the compressor, and the low pressure cooling system being supplied from an intermediate stage of the compressor.

2. The gas turbine set according to claim 1, wherein the working fluid is an air mass flow having a total pressure higher than the pressure of the driven cooling air mass flow.

3. The gas turbine set according to claim 1, wherein the working fluid flow is an air mass flow branched off from the compressor at a point of higher pressure.

4. The gas turbine set according to claim 1, wherein the working fluid is a steam mass flow.

5. The gas turbine set according to claim 1, wherein means for adjusting the working fluid mass flow are arranged in a supply duct for the working fluid.

6. The gas turbine set according to claim 1, wherein the gas turbine set is a gas turbine set with sequential combustion.

7. The gas turbine set according to claim 1, wherein an ejector is arranged in the low pressure cooling system and is operable with a partial flow of the cooling air from the high pressure cooling system as working fluid.

8. The gas turbine set according to claim 1, wherein the high pressure cooling system is connected to a first combustor and a first turbine of a gas turbine set with sequential combustion, and the low pressure cooling system is connected to a second combustor and a second turbine of the gas turbine set.

9. The gas turbine set according to claim 1, wherein the air mass flow of the working fluid is less than 10% of the driven mass flow.

10. The gas turbine set according to claim 1, wherein the air mass flow of the working fluid is less than 5% of the driven mass flow.

11. A gas turbine set, with a cooling air system through which at least one cooling air mass flow flows from a compressor to thermally highly loaded components of the gas turbine set, wherein means for increasing the pressure of flowing cooling air are arranged in a cooling air duct of the cooling air system, the means for increasing the pressure are ejectors operable with a working fluid, wherein the working fluid mass flow is less than 20% of a driven cooling air mass flow;

wherein the thermally highly loaded components comprise a combustor and a turbine, a first portion of the cooling air mass flow flowing to the combustor and subsequently to the turbine, and a second portion of the cooling air mass flow flowing from the compressor to the turbine, thereby bypassing the combustor.

* * * * *